United States Patent
Wolfe et al.

(10) Patent No.: US 6,735,953 B1
(45) Date of Patent: *May 18, 2004

(54) TURBOMACHINE-DRIVEN ENVIRONMENTAL CONTROL SYSTEM

(75) Inventors: David Wolfe, Rolling Hills Estates, CA (US); Nguyen Q. Minh, Fountain Valley, CA (US); Kurt Meister, Rio Rancho, NM (US); Dan S. Matulich, Rolling Hills Estates, CA (US)

(73) Assignee: Allied Signal Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 85 days.

(21) Appl. No.: 08/995,786

(22) Filed: Dec. 22, 1997

(51) Int. Cl.[7] .............................. F02C 6/08; F02C 7/10; F02C 3/00
(52) U.S. Cl. .................. 60/785; 60/39.511; 60/39.183; 165/144
(58) Field of Search .................... 60/39.07, 784, 60/785, 39.5, 39.511, 39.83, 226.1, 728, 786, 787, 788, 39.141, 39.142, 39.183; 454/71, 76; 415/176, 178; 165/144, 145

(56) References Cited

U.S. PATENT DOCUMENTS

| | | | | |
|---|---|---|---|---|
| 2,391,838 A | * | 12/1945 | Kleinhans ................. 60/39.07 |
| 2,409,159 A | * | 10/1946 | Singleton ..................... 60/728 |
| 2,729,433 A | * | 1/1956 | Berg ........................... 165/145 |
| 2,916,890 A | * | 12/1959 | Stein ........................ 60/39.183 |
| 3,180,406 A | * | 4/1965 | Oechslin ..................... 165/144 |
| 3,241,316 A | * | 3/1966 | Endres ......................... 60/39.5 |
| 3,659,417 A | * | 5/1972 | Grieb ........................ 60/39.07 |
| 4,038,816 A | * | 8/1977 | Wright ....................... 60/39.17 |
| 4,091,613 A | * | 5/1978 | Young ........................ 60/39.07 |
| 4,132,064 A | * | 1/1979 | Kumm ..................... 60/39.141 |
| 4,327,803 A | * | 5/1982 | Muellejans et al. ......... 165/166 |
| 4,382,359 A | * | 5/1983 | Sampayo ................. 60/39.511 |
| 4,392,614 A | * | 7/1983 | Groth et al. ................. 239/215 |
| 4,503,666 A | | 3/1985 | Christoff |
| 4,684,081 A | | 8/1987 | Cronin |
| 4,743,516 A | * | 5/1988 | Noguchi et al. ............... 429/16 |
| 4,991,394 A | * | 2/1991 | Wright ....................... 60/226.1 |
| 5,004,044 A | * | 4/1991 | Horgan et al. .............. 165/145 |
| 5,136,837 A | * | 8/1992 | Davison ..................... 60/39.07 |
| 5,137,230 A | * | 8/1992 | Coffinberry ............... 244/118.5 |
| 5,319,925 A | * | 6/1994 | Hendriks et al. ......... 60/39.183 |
| 5,363,641 A | * | 11/1994 | Dixon et al. ............... 60/39.02 |
| 5,414,992 A | * | 5/1995 | Glickstein .................. 60/39.02 |
| 5,442,905 A | * | 8/1995 | Claeys et al. .............. 60/39.07 |
| 5,452,573 A | * | 9/1995 | Glickstein et al. .......... 60/39.02 |
| 5,482,791 A | * | 1/1996 | Shingai et al. ................ 429/23 |
| 5,678,647 A | | 10/1997 | Wolfe et al. |
| 5,956,960 A | * | 9/1999 | Niggeman .................. 60/39.07 |
| 6,024,859 A | * | 2/2000 | Hsu ............................ 205/343 |

FOREIGN PATENT DOCUMENTS

| | | |
|---|---|---|
| EP | 0743247 | 11/1996 |
| WO | WO 97 15786 | 5/1997 |

* cited by examiner

*Primary Examiner*—Ted Kim
(74) *Attorney, Agent, or Firm*—Oral Caglar, Esq.

(57) ABSTRACT

An environmental control system includes a turbomachine and an air cycle machine that is driven by shaft power of the turbomachine. The turbomachine includes a compressor, which supplies compressed bleed air to the air cycle machine. Ambient air is compressed by the compressor, and heat of compression is removed by an air-to-air heat exchanger, which envelops the turbomachine. The cooled, compressed air is expanded in the air cycle machine to produce a stream of cooled, conditioned air. Ambient air used by the air-to-air heat exchanger to cool the compressed bleed air is drawn into the turbomachine's exhaust by an eductor.

8 Claims, 3 Drawing Sheets

TURBOMACHINE-DRIVEN ENVIRONMENTAL CONTROL SYSTEM

BACKGROUND OF THE INVENTION

The invention relates to environmental control systems. The invention also relates to turbomachines.

The assignee of the present invention is quite accomplished in the design of environmental control systems, as evidenced by the following sampling of their U.S. Pat. No. 4,018,060 to Kinsell, Noe and Campbell; U.S. Pat. No. 4,352,273 to Kinsell, Saba and Strang; U.S. Pat. No. 4,967,565 to Thomson, Matulich and Emerson; and U.S. Pat. No. 5,299,763 to Becosby and Araki. The environmental controls systems disclosed in these four patents are driven by bleed air from propulsion engines.

SUMMARY OF THE INVENTION

An environmental control system comprises a turbomachine; and an air cycle machine driven by shaft power of the turbomachine. The air cycle machine is adapted to receive bleed air from the compressor of the turbomachine.

DETAILED DESCRIPTION OF THE INVENTION

Figure 1:
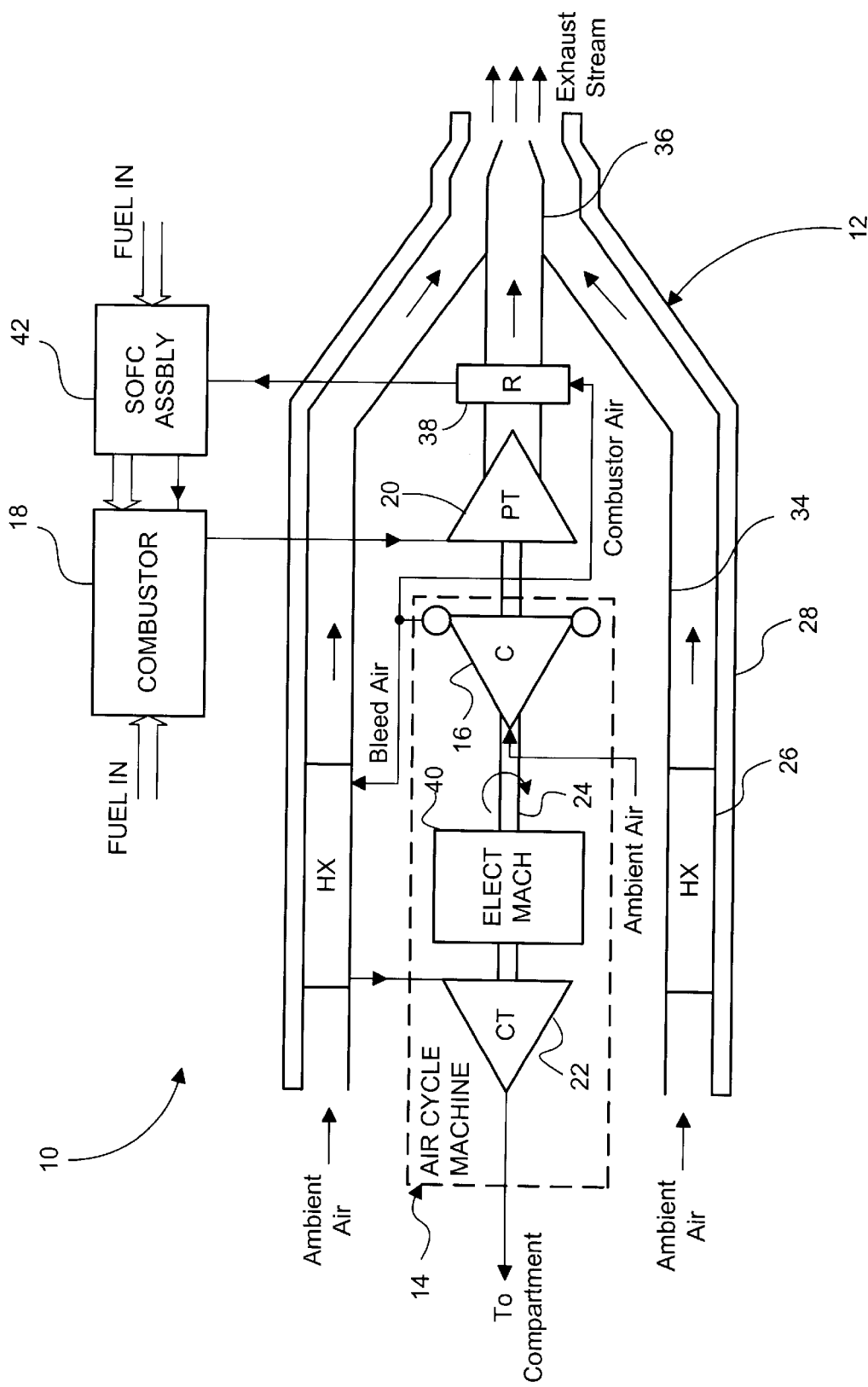
FIG. 1 is a schematic diagram of a turbomachine-driven environmental control system.

FIG. 1 shows an environmental control system (ECS) 10 including a turbomachine 12 and an air cycle machine 14 that is driven by shaft power of the turbomachine 12. The turbomachine 12 includes a compressor 16, which draws in and pressurizes ambient air; a combustor 18, which ignites a mixture of a combustible fuel and pressurized air to produce a hot, expanding gas; and a power turbine 20, which expands the gas leaving the combustor 18 to produce shaft power. The air cycle machine 14 is adapted to receive bleed air from the compressor 16. The air cycle machine 14 expands the bleed air and removes moisture from the bleed air to provide a cooled, conditioned stream of air. The bleed air can be expanded, and the moisture removed, in any number of ways. The air cycle machine 14 can have a two, three or four wheel design. One of the wheels is provided by a cooling turbine 22, and another one of the wheels is provided by the compressor 16. Thus, the turbomachine 12 and the air cycle machine 14 utilize the same compressor 16.

The power turbine 20 and the cooling turbine 22 are shown as being mounted on a common output shaft 24, whereby the cooling turbine 22 is operated at shaft speed. In the alternative, the power turbine 20 and cooling turbine 22 could have separate shafts that are connected via a gearbox (not shown), whereby the cooling turbine 22 is operated at reduced speeds.

The cooling turbine 22 can be provided with a regulator (not shown) for regulating the flow rate of the bleed air from the compressor 16 to the air cycle machine 14. A regulator such as a nozzle can be mounted in the cooling turbine 22 without the need for any overriding controls. In the alternative, a regulator such as a valve can be placed in the flow path between the compressor 16 and the cooling turbine 22. However, regulation of the bleed air is not required. Absent regulation, cooling is determined by the shaft speed of the turbomachine 12. Increasing shaft speed of the turbomachine 12 increases the amount of bleed air that is supplied to the air cycle machine 14, resulting in a higher flow rate of conditioned air. Idling the turbomachine 12 causes the least amount of bleed air to be supplied to the air cycle machine 14.

Figure 2:
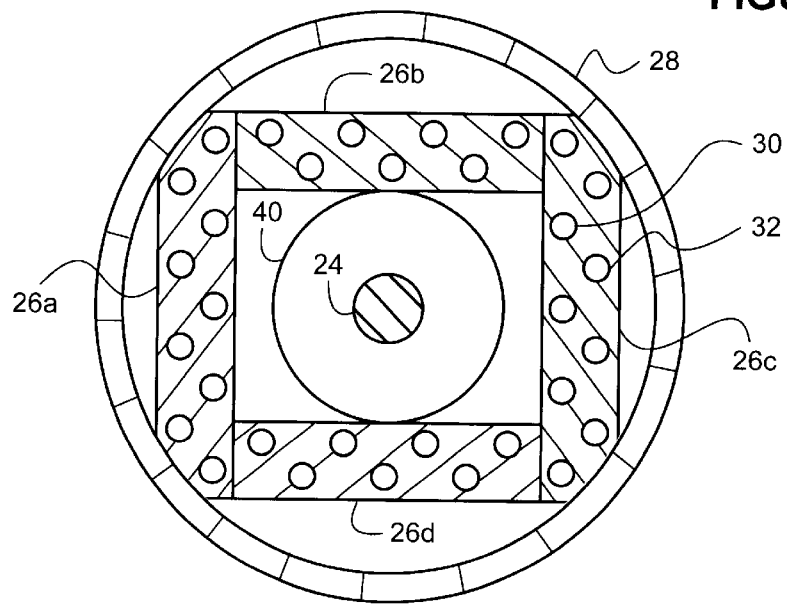
FIG. 2 is a cross-sectional view of a turbomachine, which forms a part of the turbomachine-driven environmental control system.

Before being supplied to the air cycle machine 14, the bleed air from the compressor 16 is cooled to near-ambient temperature by an air-to-air heat exchanger 26. Ambient air is drawn into the turbomachine 12 and flows through a cold side of the heat exchanger 26. Depending upon the design of the heat exchanger 26, ambient air can also flow around the heat exchanger 26. The bleed air is ducted to a hot side of the heat exchanger 26. The heat exchanger 26 is secured to the turbomachine's housing 28, near the inlet of the turbomachine 12 so as to avoid obstructions, icing, etc. The heat exchanger 26 can have a circular cross-section, or it can have the quad-shaped design shown in FIG. 2. A heat exchanger 26 having the quad-shaped design includes four separate rectangular modules 26a, 26b, 26c, 26d that are attached together. The modules 26a, 26b, 26c, 26d can be secured to the housing 28 by means such as standoffs (not shown). Ambient air flows through cold side passageways 30, and the bleed is ducted through hot side passageways 32.

The heat exchanger 26 is wrapped around one or more components of the turbomachine 12 to increase compactness and enhance portability of the ECS 10. Wrapping the heat exchanger 26 around the turbomachine 12 also helps to muffle noise generated by turbomachine components such as an electrical machine. Additionally, the heat exchanger 26 functions as a heat sink for heat generated by the components of the turbomachine 12. Heat is carried off by the ambient air flowing through and around the heat exchanger 26.

The ambient air flowing through the air-to-air heat exchanger 26 is directed towards the turbomachine's outlet by a duct 34. The duct 34 can be attached to the housing 28 by means such as standoffs (not shown). A forward portion of the duct 34 can also be attached to the heat exchanger 26.

An exhaust stream leaving the power turbine 20 is directed to the turbomachine's outlet by an educator 36. Near the turbomachine outlet, the diameter of the educator 36 is reduced to increase the velocity of the power turbine exhaust stream. The resulting high velocity, low static pressure boundary creates a "jet effect" which draws the ambient air into the turbomachine 12, past the heat exchanger 26, through the duct 34, and out of the turbomachine 12. The amount of jet effect depends upon the volumetric flow rate of the power turbine exhaust stream. The eductor 36 eliminates the need for a blower to blow air through the heat exchanger 26. Thus, the eductor 36 advantageously utilizes waste energy from the power turbine exhaust stream, waste energy that would have otherwise been thrown away.

The exhaust stream leaving the eductor 36 is mixed with the cooler ambient air leaving the duct 34. Such mixing lowers the temperature of the power turbine exhaust stream.

A recuperator 38 further lowers the noise and temperature of the power turbine exhaust stream. Additionally, the recuperator 38 transfers heat from the power turbine exhaust stream to the pressurized air flowing from the compressor 16 to the combustor 18 (the "combustor air").

The turbomachine 12 further includes an electrical machine 40 such as a permanent magnet machine, a switched reluctance machine or a wound rotor machine. The electrical machine 40 includes a stator and a rotor driven by the shaft 24. If the electrical machine 40 is designed for operation at shaft speeds, its rotor can be secured directly to the shaft 24, without the need for a gearbox. During startup of the ECS 10, the electrical machine 40 is operated as a starter motor. After startup, the electrical machine 40 is operated as an electrical generator.

A solid oxide fuel cell assembly 42 is inserted into the thermodynamic cycle of the turbomachine 12 in the manner described in U.S. Ser. No. 08/926,617 filed on Sept. 10, 1997 ("HYBRID ELECTRICAL POWER SYSTEM"), which is incorporated herein by reference. U.S. Ser. No. 08/926,617 was issued on Oct. 10, 1999 as U.S. Pat. No. 5,968,680. The turbomachine 12 supplies the combustor air to an oxidant inlet of the assembly's solid oxide fuel cell. The recuperator 38 heats the combustor air to the operating temperature of the solid oxide fuel cell, which allows operation of the solid oxide fuel cell to begin. The solid oxide fuel cell, in turn, increases the temperature of the combustor air and supplies the combustor air to the combustor 18. Resulting is a thermodynamic cycle that increases the efficiency of both the turbomachine 12 and the solid oxide fuel cell. Electrical power generated by the solid oxide fuel cell can be combined with electrical power generated by the electrical machine 40. When boost power is demanded of the ECS 10, fuel flow to the turbomachine 12 is increased.

Figure 3:
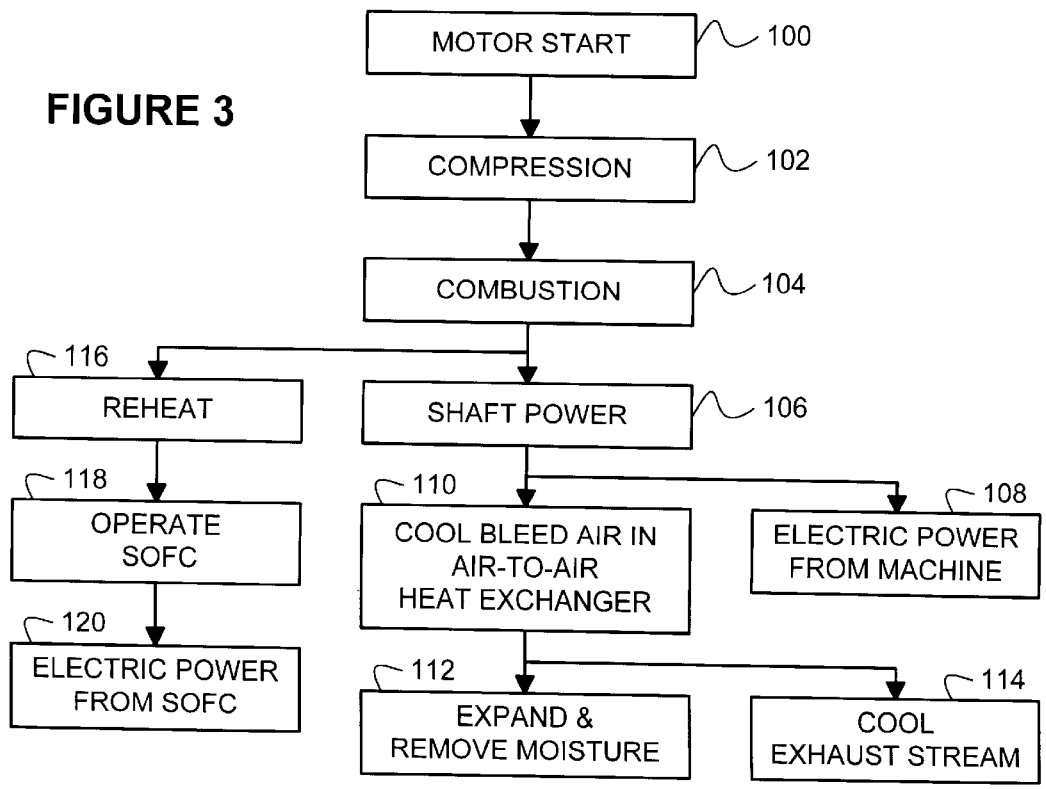
FIG. 3 is a flowchart of a method of operating the turbomachine-driven environmental control system.

FIG. 3 shows the steps for operating the ECS 10. The electrical machine 40 is operated as a starter motor (step 100), causing the compressor 14 to draw in, and pressurize, ambient air (step 102). Pressurized air is supplied to the combustor 16, mixed with the combustible fuel, and ignited (step 104). The hot gas leaving the combustor 16 is expanded in the power turbine 18, thereby creating shaft power which drives the electrical machine 40 and the air cycle machine 14 (step 106). Once the motoring function is no longer needed, the electrical machine 40 is operated as an electrical generator (step 108).

The exhaust stream exiting the power turbine 18 is cooled by the recuperator 38, and directed out of the turbomachine 12 by the eductor 36. The eductor 36 pinches down on the power turbine exhaust stream to create a jet effect, which draws ambient air into the turbomachine 12 and past the air-to-air heat exchanger 26.

Pressurized air that is bled off the compressor 14 is cooled to near ambient temperature by the air-to-air heat exchanger 26 (step 110). The air cycle machine 14 expands and removes moisture from the cooled bleed air to produce a stream of cooled, conditioned air (step 112).

In the meantime, the ambient air that is drawn past the air-to-air heat exchanger 26 is ducted towards the outlet of the turbomachine 12 and mixed with the power turbine exhaust stream (step 114). As a result of the mixing, the temperature of the power turbine exhaust stream is lowered.

Once the recuperator 38 heats the combustor air to the operating temperature of the solid oxide fuel cell (step 116), operation of the solid oxide fuel cell begins (step 118). Electrical power can then be extracted from the solid oxide fuel cell (120).

Thus disclosed is an environmental control system 10 which provides a stream of cooled, conditioned air without the use of refrigerants and without directly impacting the performance of a propulsion engine. Moreover, the environmental control system 10 offers relatively quiet operation and are relatively cool exhaust stream. In addition to providing the cooled, conditioned air, the environmental control system 10 also generates electricity, which can be used :as an auxiliary or emergency source for vehicles. Boost power can be delivered on demand.

Figure 4:
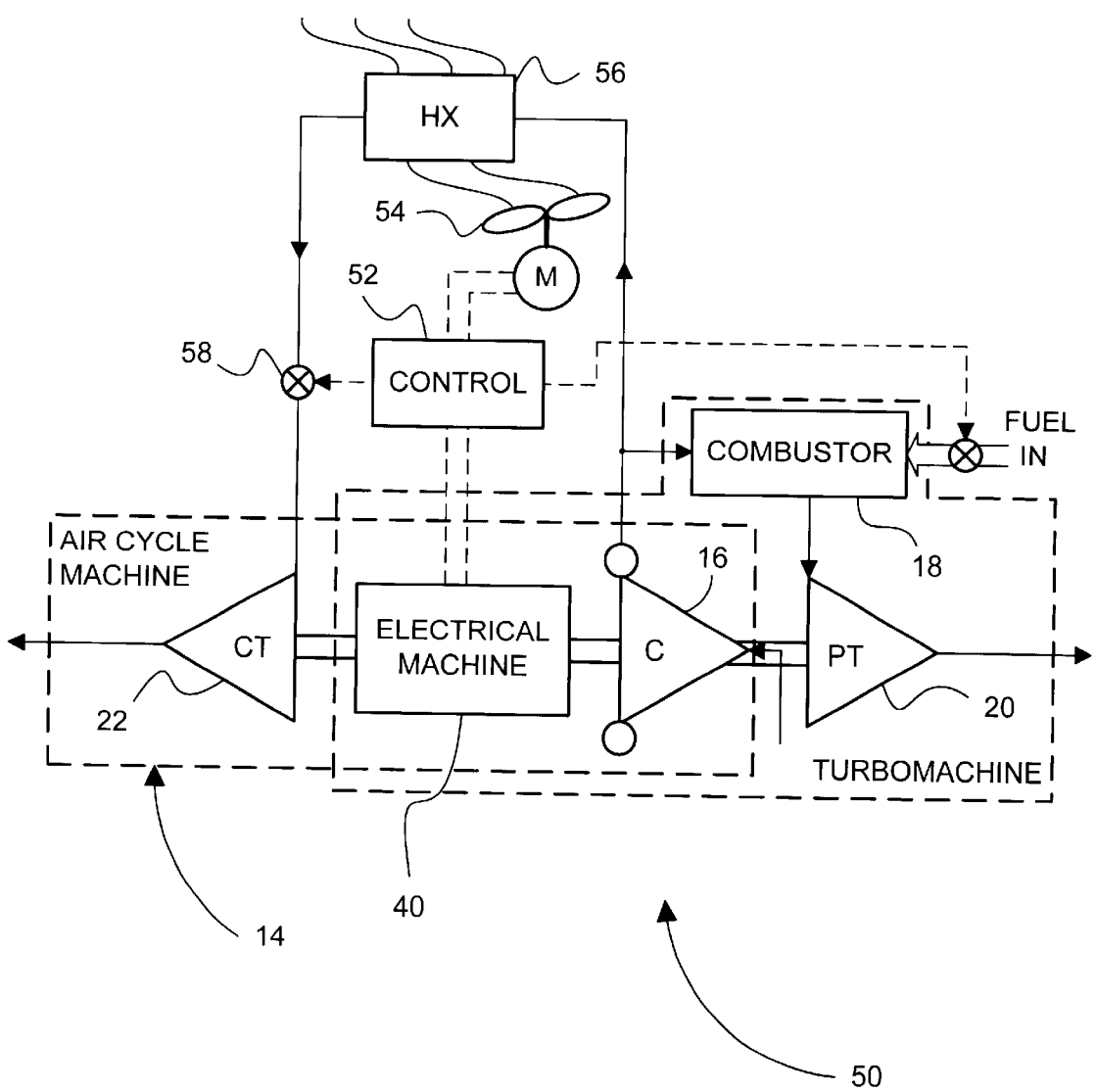
FIG. 4 is a schematic diagram of an alternative embodiment of a turbomachine-driven environmental control system.

FIG. 4 shows an ECS 50 adapted to provide conditioned air and electricity to a stationary system such as a ground cooling cart. When cooling is desired, a controller 52 connects an electric fan 54 to the electrical machine 40, thereby causing the electric fan 54 to draw ambient air past a standalone heat exchanger 56. The controller 52 also commands a valve 58 to open and allow bleed air to flow to the air cycle machine 14.

Modifications can be made without departing from the spirit and scope of the invention. For example, the heat exchanger 26 of the ECS 10 could be located remotely from the turbomachine 12. However, integrating the heat exchanger 26 into the turbomachine 12 as described above increases the convenience of installation, improves portability of the ECS 10, reduces noise generated by the turbomachine 12 and reduces ducting and plumbing losses that would occur between a remote cooling exchanger and the turbomachine 12. These considerations, and other considerations including size of cooling turbine 16, geometry and size of the heat exchanger 26, design of the air cycle machine 14, and flow rate of bleed air to the air cycle machine 14, are all dependant upon the requirements of the end user.

We claim:

1. An environmental control system comprising:
   a turbomachine;
   an air cycle machine driven by shaft power of the turbomachine, the air cycle machine including a compressor and a cooling turbine; and
   an air-to-air heat exchanger for cooling bleed air from the compressor en route to the cooling turbine, the heat exchanger being wrapped around at least a portion of the air cycle machine, the heat exchanger having a quad-shaped design.

2. The system of claim 1, wherein the turbomachine includes a power turbine, and wherein the power turbine and the cooling turbine are mounted on a single shaft.

3. The system of claim 1, wherein the air-to-air heat exchanger includes four separate modules.

4. The system of claim 1, wherein the turbomachine includes a power turbine and an eductor downstream the power turbine, the eductor being operative to draw ambient air into the turbomachine and past the air-to-air heat exchanger.

5. The system of claim 4, wherein the turbomachine further includes a duct for ducting the air drawn past the air-to-air heat exchanger towards an outlet of the turbomachine, the ducted air being mixed with a power turbine exhaust stream leaving the power turbine.

6. An environmental control system comprising:
   a turbomachine;
   an air cycle machine driven by shaft power of the turbomachine, the air cycle machine including a compressor and a cooling turbine;
   an air-to-air heat exchanger for cooling bleed air from the compressor en route to the cooling turbine, the heat exchanger being wrapped around at least a portion of the air cycle machine;
   a combustor; and
   a fuel cell having an oxidant inlet coupled to an outlet of the compressor, the fuel cell having an oxidant-outlet coupled to an inlet of the combustor.

7. The system of claim 6, wherein the turbomachine further includes a recuperator for heating air flowing from the compressor outlet to the oxidant inlet of the solid oxide fuel cell.

8. The system of claim 6, further comprising an electrical machine, the electrical machine and the fuel cell being capable of providing a controlled electrical output.

* * * * *